(12) United States Patent
Jinkawa

(10) Patent No.: US 6,272,578 B1
(45) Date of Patent: Aug. 7, 2001

(54) PROGRAMMABLE CONTROLLER

(75) Inventor: Takeshi Jinkawa, Kyoto (JP)

(73) Assignee: Omron Corporation, Kyoto (JP)

( * ) Notice: Subject to any disclaimer, the term of this patent is extended or adjusted under 35 U.S.C. 154(b) by 0 days.

(21) Appl. No.: 09/091,507

(22) PCT Filed: Dec. 25, 1996

(86) PCT No.: PCT/JP96/03790

§ 371 Date: Jun. 19, 1998

§ 102(e) Date: Jun. 19, 1998

(87) PCT Pub. No.: WO97/23812

PCT Pub. Date: Jul. 3, 1997

(30) Foreign Application Priority Data

Dec. 25, 1995 (JP) .................................................. 7-336939

(51) Int. Cl.⁷ ...................................................... G06F 13/00
(52) U.S. Cl. .......................... 710/110; 710/200; 364/140; 364/147
(58) Field of Search .................................... 710/128, 110, 710/200, 52, 1; 364/131, 140, 136, 138, 141, 146, 147; 318/568.1, 568.11

(56) References Cited

U.S. PATENT DOCUMENTS 4,703,414 * 10/1987 Inoue et al. ........................... 364/147
5,177,420 * 1/1993 Wada et al. ...................... 318/568.11
5,437,048 * 7/1995 Morita et al. ......................... 709/208
5,774,355 * 6/1998 Mizuno et al. .

FOREIGN PATENT DOCUMENTS

| 58-099805 | * | 6/1983 | (JP) . |
| 58-99805 | | 6/1983 | (JP) . |
| 2-291001 | | 11/1990 | (JP) . |
| 6-43913 | | 2/1994 | (JP) . |
| 6043913 | * | 2/1994 | (JP) . |
| 7-84616 | | 3/1995 | (JP) . |

* cited by examiner

Primary Examiner—Ario Etienne
(74) Attorney, Agent, or Firm—Foley & Lardner

(57) ABSTRACT

A user program stored in a user program memory of a programmable controller includes a control program from which a description defining interlock conditions is excluded and an interlock program defining interlock conditions for the result of processing conforming to the control program and described separately from the control program. The control program is first read out of the user program memory, and operation processing is executed in accordance with the control program. The result of the operation is written into an I/O memory. Thereafter, the interlock program is read out of the user program memory, and operation processing conforming to the interlock program is executed. The result of the operation conforming to the interlock program is overwritten on the I/O memory.

10 Claims, 8 Drawing Sheets

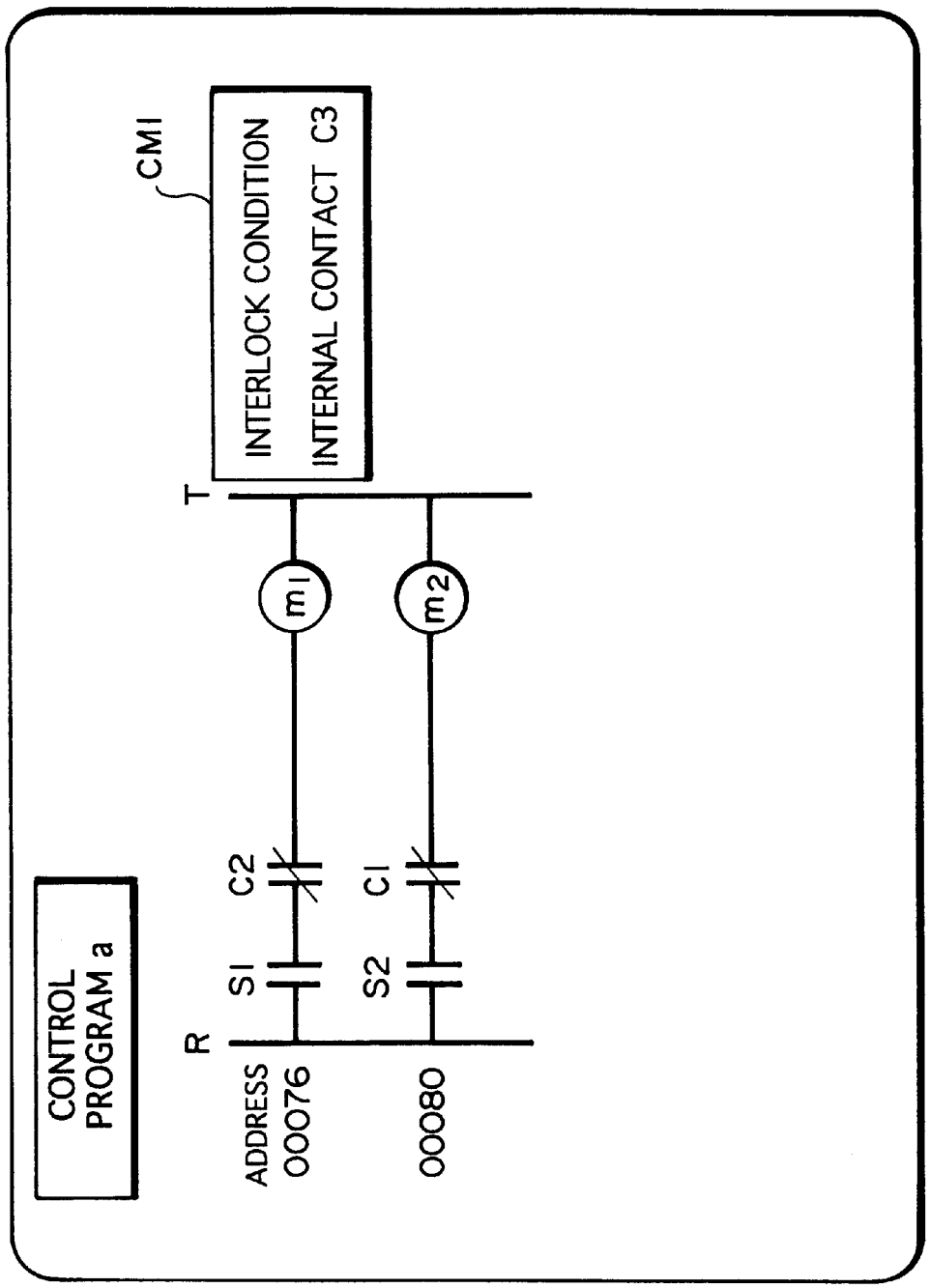

PROGRAMMABLE CONTROLLER

TECHNICAL FIELD

The present invention relates to a programmable controller.

BACKGROUND ART

A user program for controlling a controlled system is contained in a programmable controller. The user program is generally described by a ladder language, an SFC (a sequential function chart), and so forth.

The user program is constituted by a plurality of modules in many cases. The modules are respectively allocated parts of the control of the controlled system. Division of the user program into the plurality of modules is particularly effective in a case where the control of the controlled system is complicated. It is also effective in order to facilitate the creation of the user program or share the creation of the user program among a plurality of persons even if a control system is not necessarily complicated. The control system is divided depending on control equipments constituting the controlled system, the types of driving devices, the control functions and so forth, and the control of each of parts formed by the division is allocated to each of the modules.

FIG. 7 illustrates one example of a control system using a programmable controller. There is a conveyer for carrying an article from a point x1 to a point x2. A motor M2 is provided for driving the conveyer in the forward direction (rightward in FIG. 7). A conveyer for carrying the article from the point x2 to a point x3 is driven in the forward direction by a motor M3. It is necessary to return the article from the point x3 (or x2) to the point x2 (or x1) in an emergency, or in order to cope with the other situation. A motor M1 is provided in order to drive the above-mentioned two conveyers in the reverse direction (leftward in FIG. 7). A plurality of user program modules share the control of the control system depending on the share of driving devices (control equipments), the control ranges, the driving directions and so forth.

Consider a case where the control range is divided into right and left control ranges with the point x2 used as the boundary, and user program modules sharing each of the control ranges are created. In the left range, a switch SW2 for moving the conveyer in the forward direction and a switch SW1 for moving the conveyer in the reverse direction are provided in a control panel 51. In the right range, a switch SW4 for moving the conveyer in the forward direction and a switch SW3 for moving the conveyer in the reverse direction are provided in a control panel 52. Switch inputs from the switches SW1 to SW4 are fed to an I/O unit 41 connected to a programmable controller 40. The motors M1 to M3 are driven by output signals from the I/O unit 41. A user program for controlling the motors M1 to M3 in response to the inputs from the switches SW1 to SW4 is stored in a user program memory in the programmable controller 40.

A user program module A for controlling the left half range and a user program module B for controlling the right half range are illustrated by a ladder diagram in FIG. 8.

In the ladder diagram, reference signs m1, m2 and m3 denote relays for respectively representing outputs for driving the motors M1, M2 and M3. Reference signs s1, s2, s3 and s4 denote input contacts (normally open contacts) respectively representing signals fed from the switches SW1, SW2, SW3 and SW4. Reference signs c1, c2 and c3 denote internal contacts (normally closed contacts) respectively opened or closed by the relays m1, m2 and m3.

In the module A, when the switch SW2 is turned on, the input contact s2 is closed, whereby the relay m2 operates so that the motor M2 is driven, provided that the internal contact c1 is on (provided that the motor M1 is not driven) (an address 00093). When the switch SW1 is turned on, the input contact s1 is closed, whereby the relay m1 operates so that the motor M1 is driven, provided that the internal contacts c2 and c3 are on (provided that both the motors M2 and M3 are not driven) (an address 00088).

In the module B, when the switch SW4 is turned on, the input contact s4 is closed, whereby the relay m3 operates so that the motor M3 is driven, provided that the internal contact c is on (provided that the motor M1 is not driven) (an address 00157). When the switch SW3 is turned on, the input contact s3 is closed, whereby the relay m1 operates so that the motor M1 is driven, provided that the internal contacts c2 and c3 are on (provided that both the motors M2 and M3 are not driven) (an address 00152).

To prevent an equipment or a device from starting its operations or prevent the operations from being continued unless conditions set in advance are satisfied is referred to as interlock. In the above-mentioned examples of the modules A and B, the internal contacts c1, c2 and c3 realize the interlock. A program for realizing the interlock (including its part) is referred to as an interlock program.

In the module A, inputs are si and s2, and outputs are m1 and m2. The internal contacts c1 and c2 are respectively related to the outputs m1 and m2. However, the internal contact c3 is related to the output m3 of the module B. Similarly, in the module B, the internal contact c2 is related to the output m2 of the module A.

As described in the foregoing, in a case where the control of the controlled system is divided into a plurality of parts from the points of view of the control equipment or device or the driving device constituting the controlled system, the control range, the control function and so forth, and the parts of the control are respectively allocated to the user program modules, the interlock program in each of the user program modules include an element related to the module and an element related to the other module in many cases. When one of the user program modules is created, the description of the element related to the other user program module particularly involves difficulties in many cases. The reason for this is that when the one module is created, the input and output states, the order in which programs are executed and so forth in the other module must be sufficiently grasped. When a plurality of persons share the creation of the modules, it involves further difficulties.

DISCLOSURE OF INVENTION

An object of the present invention is to provide the structure of a user program, including a part related to interlock, which is relatively easy to create.

Another object of the present invention is to provide a programmable controller storing a user program which is relatively easy to create and a method of operating the same.

A user program for a programmable controller according to the present invention includes a control program from which a description defining interlock conditions is excluded and an interlock program defining interlock conditions for the result of processing conforming to the control program and described separately from the control program, and has a structure ensuring that the interlock program is executed after the control program is executed.

The user program is stored in a memory device of a programming device (a semiconductor memory, a hard disk, a floppy disk, etc.), a portable recording medium (a CD-ROM, a floppy disk, etc.), a user program memory of the programmable controller, or the like.

Such ensuring that the interlock program is executed after the control program is executed can be realized by various methods. When the user program is executed in the order of addresses, for example, an address having a small value may be assigned to the control program, and an address having a large value may be assigned to the interlock program. An identification code for discriminating between the control program and the interlock program may be assigned.

To what part the user program should be described as the interlock program can be determined depending on the intention of a programmer. The interlock conditions generally mean interlock conditions of an output.

The present invention is particularly advantageous to a user program having a structure in which a plurality of control program modules are created, thereby sharing control of a controlled system.

A user program according to the present invention includes a control program, from which a description defining interlock conditions is excluded, comprising a plurality of control program modules sharing control of a controlled system and an interlock program defining interlock conditions for the result of processing conforming to the plurality of control program modules and described separately from the control program, and has a structure ensuring that the interlock program is executed after all the control program modules are executed.

Also in this case, to what part the user program should be included in the interlock program is arbitrary.

Most preferably, the interlock conditions of an output in one of the control program modules are determined in relation to an element of control (for example, an output) allocated to the other control program module, and the interlock conditions are described as an interlock program.

As a result, when one of the control program modules is created, the element related to the other control program module need not be considered, and the order of execution need not be necessarily considered, so that the control program module is easy to create. Even in creating the interlock program, only interlock conditions over the plurality of control program modules may be considered, resulting in improved work efficiency.

The present invention also provides a method of executing the user program having the above-mentioned structure. This method is a method comprising the steps of first, in accordance with the ensuring, reading out the control program from the storage medium, performing processing conforming to the control program and writing the result thereof into an I/O memory, and reading out an interlock program from the storage medium, performing processing conforming to the interlock program and writing the result thereof into the I/O memory after performing the whole of the control program.

The result of the processing conforming to the interlock program is written into the I/O memory after the result of the processing conforming to the control program is written. When the result of the processing conforming to the control program and the result of the processing conforming to the interlock program are related to the same output, therefore, priority is given to the result of the processing conforming to the interlock program. The interlock conditions which have been incorporated into the interlock program thus correctly function.

The present invention further provides a programmable controller in which the user program having the abovementioned structure is set. The programmable controller comprises a user program memory storing a user program including a control program from which a description defining interlock conditions is excluded and an interlock program defining interlock conditions for the result of processing conforming to the control program and described separately from the control program, an I/O memory storing data relating to an input for the user program and an output obtained by processing conforming to the user program, and a processor for first reading out the control program from the user program memory, performing processing conforming to the control program and writing the result thereof into the I/O memory, and then reading out the interlock program from the user program memory, performing processing conforming to the interlock program and writing the result thereof into the I/O memory. Similarly in the programmable controller, the interlock conditions which have been defined by the interlock program correctly function.

In a preferred embodiment, the control program comprises a plurality of control program modules sharing the control of a controlled system, and the interlock program describes interlock conditions excluded from the plurality of control program modules. In this case, more preferably, the interlock conditions concerning one of the control program modules may be determined in relation to an output generated from the other control program module and described in the interlock program.

The present invention further provides a device for creating the user program having the above-mentioned structure. The programming device comprises an input device and a storage device, and accepts input of a control program from which a description defining interlock conditions is excluded through the input device, accepts input of an interlock program describing interlock conditions for the result of processing conforming to the control program separately from the input of the control program, and stores in the storage device the control program and the interlock program which have been accepted upon correlating therewith.

In a preferred embodiment, the programming device further comprises a display device, and the control program is displayed on the display device, the correlation between the displayed control program and the interlock program, or the interlock program correlated with the displayed control program are displayed thereon. Consequently, the control program and the interlock program related thereto can be well understood.

BRIEF DESCRIPTION OF DRAWINGS

FIGS. 3 and 4 respectively illustrate examples of display of the correlation between a control program module and an interlock condition;

BEST MODE FOR CARRYING OUT THE INVENTION

Figure 1:
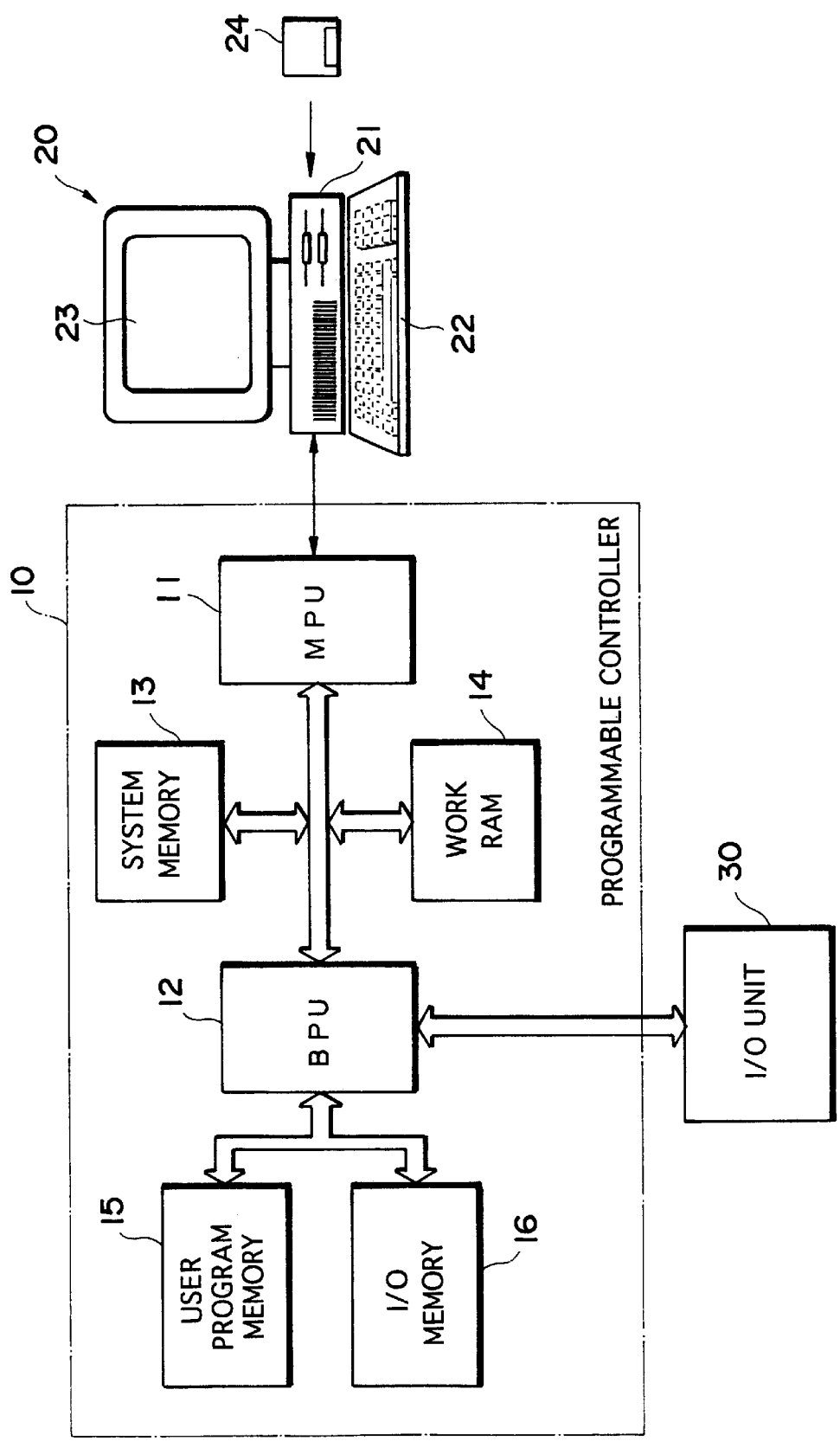
FIG. 1 is a block diagram showing an I/O unit and a programming tool together with the structure of a programmable controller.

FIG. 1 illustrates a programming tool and an I/O unit centered around a programmable controller. Although the programmable controller is also referred to as a programmable logic controller (PLC), it is simply described as a programmable controller in this description. When a controlled system is controlled, an I/O unit is connected to the programmable controller. At this time, the programmable controller is not generally connected to a programming tool. When a user program is created, or the user program is loaded in the programmable controller after being created, the programmable controller is connected to the programming tool. FIG. 1 illustrates the programmable controller together with devices or equipments around the programmable controller for convenience.

A programmable controller 10 comprises an MPU (a microprocessing unit) 11, a BPU (a bit processing unit) 12, a system memory (ROM) 13, a work RAM 14, a user program memory (RAM) 15, an I/O memory (RAM) 16 and so forth, which are connected to one another by an internal bus. An I/O unit 30 is connected to the BPU 12 by an I/O bus. A programming tool 20 is connected to the MPU 11 in the programmable controller 10 through a serial communication line.

The system memory 13 stores a system program for controlling the overall operation of the programmable controller 10. The user program memory 15 stores a user program for controlling the controlled system (the details will be described later) which is created by the programming tool 20. The I/O memory 16 stores data representing the states of inputs (input contacts) concerning all input variables used in the user program, data representing the states of outputs (output relays) concerning all output variables obtained by executing the user program, data representing the states of internal contacts required to execute the user program, and the other data. The input is obtained from the I/O unit 30, and the output is fed to the I/O unit 30. The work RAM 14 is for temporarily storing various types of data in executing the system program and the user program, and is used as a work area.

The user program generally includes a bit operation instruction and an application operation instruction. The BPU 12 reads out the user program from the user program memory 15 in accordance with the system program, hands the application operation instruction to the MPU 11, executes the bit operation instruction, and writes the result of the operation (the state of an output) into the I/O memory 16. The BPU 12 transfers, after execution of the whole user program, the result of the operation in the I/O memory 16 to the I/O unit 30, and reads the state of an input signals from the I/O unit 30 and writes the state into the I/O memory 16. Such a refresh operation is performed in a predetermined period.

The MPU 11 executes the application operation instruction received from the BPU 12, and writes the result of the operation into the I/O memory 16. When the BPU 12 and the MPU 11 respectively output the results of operations on the same output (output variable), priority is given to the result of the operation later obtained. Specifically, the BPU 12 or the MPU 11 overwrites on the I/O memory 16 the result of the operation on the output (the user program is so created as to correctly function when priority is given to the data later obtained). The MPU 11 also communicates with the programming tool 20 through the serial communication line under control of the system program, and transfers the user program created by the programming tool 20 to the user program memory 15 through the BPU 12.

The I/O unit 30 functions as an input-output interface between the programmable controller 10 and the controlled system, converts signals from sensors arranged in the controlled system, switches of a control panel or the like into input data which can be stored in the I/O memory 16, and generates signals for controlling or driving the control equipments or devices on the basis of output data outputted from the I/O memory 16.

The programming tool 20 is realized by a so-called personal computer, and comprises a computer 21, an input device (a keyboard, a mouse, etc.) 22 and a display device 23. A programming support program recorded on a floppy disk 24 is installed in the computer 21. The computer 21 creates the user program in response to an input from the input device 22 in accordance with the programming support program. The created user program is transferred to the programmable controller 10, and is stored in the user program memory 15. On the display device 23, the computer 21 displays the user program which is being created in the process of creating the user program, displays the user program which has been created after the creation, or displays, when the programmable controller 10 executes the user program, a state where the user program is executed.

Figure 2A:
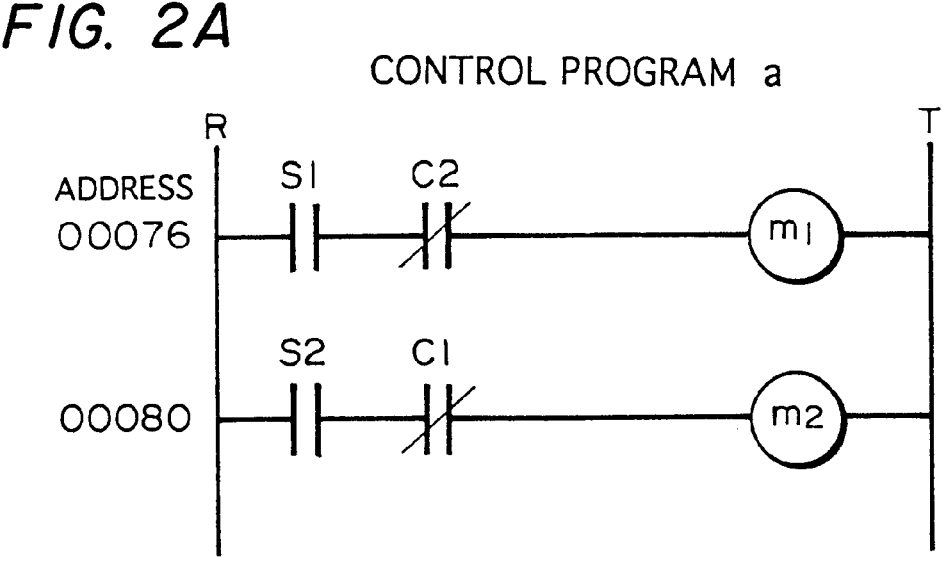
FIG. 2 is a ladder diagram showing the structure of a user program by means of one specific example.
Figure 2B:
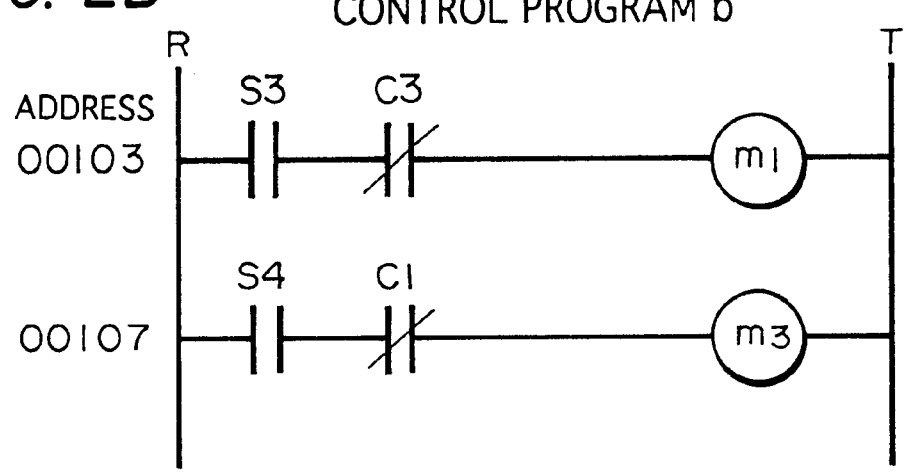
Figure 2C:
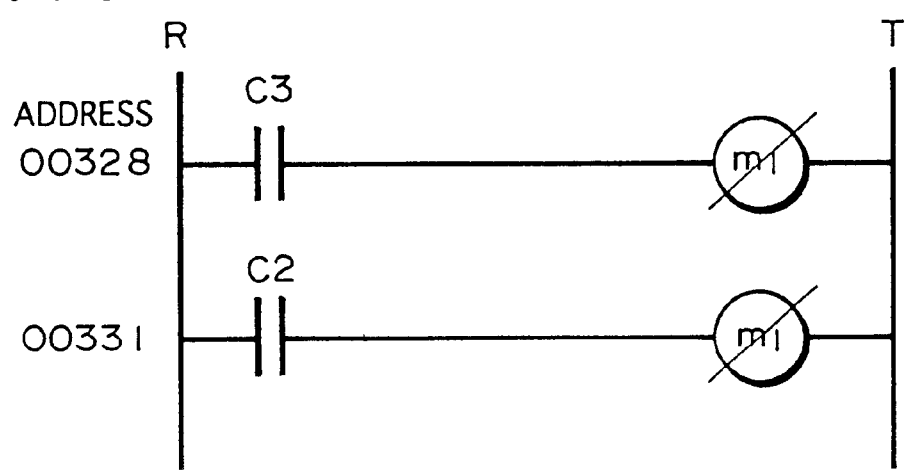

FIG. 2 illustrates an example of the user program which has been created in the programming tool 20 and stored in a hard disk of the programming tool 20, or is stored in the user program memory 15. The user program is for controlling the control system shown in FIG. 7 as described above, which corresponds to the user program shown in FIG. 8.

Figure 7:
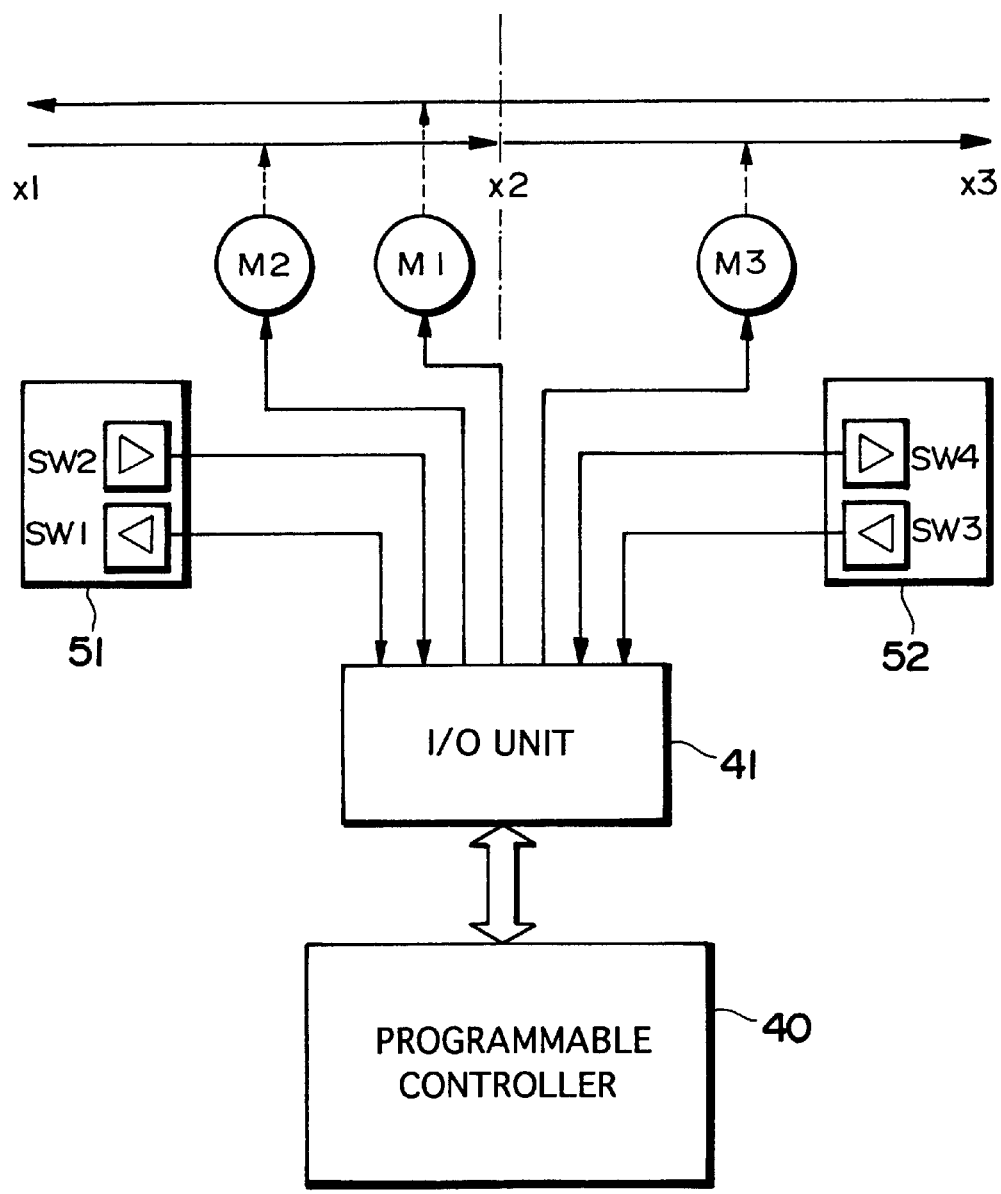
FIG. 7 is a block diagram showing one example of the whole of a controlled system and a control device.
Figure 8A:
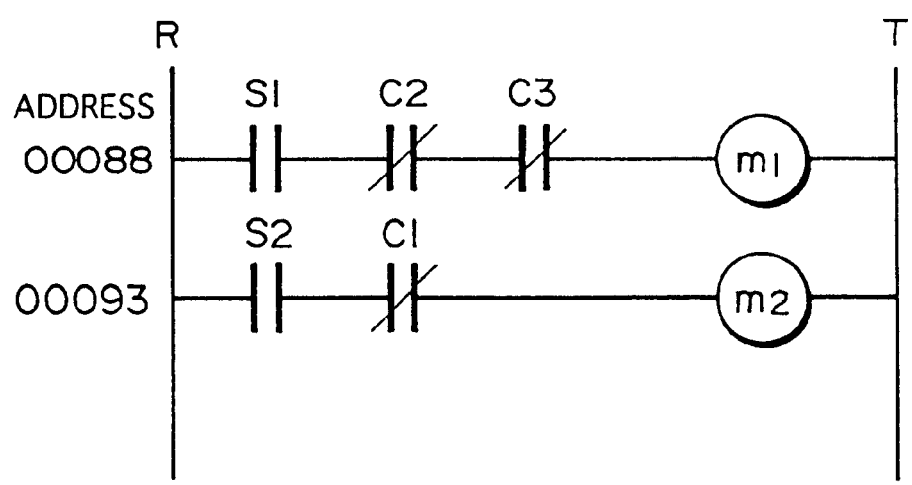
FIG. 8 is a ladder diagram showing an example of program modules including all interlock conditions.
Figure 8B:
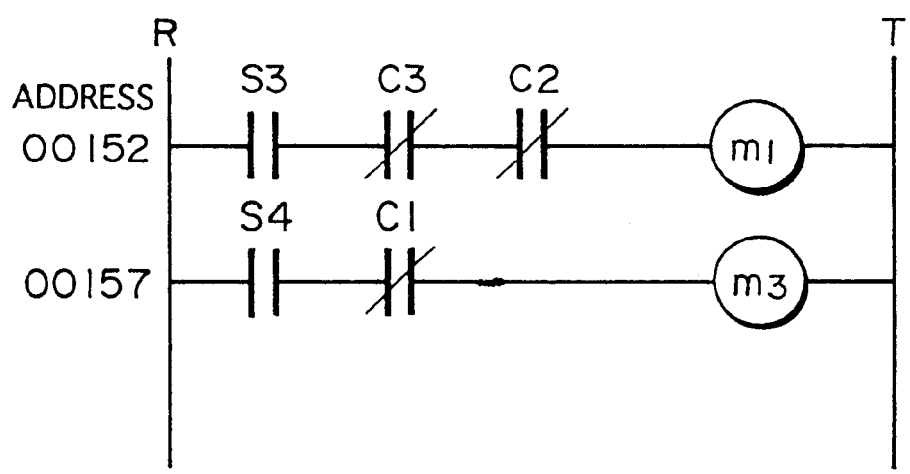

A control program module a takes charge of the control of the left half range of the control system shown in FIG. 7, and a control program module b takes charge of the control of the right half range thereof. An interlock program related to an element (an output variable) in a range other than the range which is taken charge of by the control program module a (that is, the range which is taken charge of by the control program module b) is excluded from the control program module a. Similarly, an interlock program related to an output variable which is not taken charge of by the control program module b (which is taken charge of by the control program module a) is not described in the control program module b. The interlock programs are together described as an interlock program IP at addresses succeeding addresses assigned to the control program modules a and b.

If a switch SW2 is pushed so that an input contact s2 is turned on at an address 00080 assigned to the control program module a, an output relay m2 for driving a motor M2 is turned on, provided that an internal contact c1 is on (provided that a motor M1 is not driven). When a switch SW1 is pushed, an input contact s1 is turned on at an address 00076, so that an output relay m1 for driving the motor M1 is turned on, provided that an internal contact c2 is on (provided that the motor M2 is not driven). Both an input and an output of the control program module a are within the left half range of the control system shown in FIG. 7.

If an internal contact (a normally open contact) c3 related to a motor M3 is on (the motor M3 is driven) at an address 00328 assigned to the interlock program IP, the output relay m1 of the motor M1 is turned off. The interlock program IP is executed after the control program module a is executed. The result of the execution of the operation of the control program module a is written into the I/O memory 16, after which the result of the execution of the interlock program IP is written into (overwritten on) the I/O memory 16. The result of the operation on the output relay m1 by a program of the address 00076 assigned to the control program module a is written into the I/O memory 16, and the result of the operation on the output relay m1 by a program of the address 00328 assigned to the interlock program IP is written into the same location of the I/O memory 16, so that priority is always given to the result of the execution of the interlock program IP. Therefore, it is assumed that an indication that the relay ml should be turned on is stored in the I/O memory 16 in accordance with the program of the address 00076, and that the program of the address 00328 assigned to the interlock program IP is then executed, so that the result of the operation denying that the relay m1 is turned on is obtained. In this case, output data indicating that the relay m1 should be turned on in the I/O memory 16 is rewritten to be output data indicating that it should be turned off. Priority is thus given to interlock conditions set in the interlock program IP. A combination of the control program module a and the program of the address 00328 assigned to the interlock program IP is equivalent to the program module A shown in FIG. 8.

The same is true for the control program module b. If a switch SW4 is pushed so that an input contact s4 is turned on at an address 00107 assigned to the control program module b, an output relay m3 for driving the motor M3 is turned on, provided that the internal contact c1 is on (provided that the motor M1 is not driven). When the switch SW3 is pushed, an input contact s3 is turned on at an address 00103, so that the output relay m1 for driving the motor M1 is turned on, provided that the internal contact c3 is on (provided that the motor M3 is not driven). Both an input and an output of the control program module b are within the right half range of the control system shown in FIG. 7.

If the internal contact (the normally open contact) c2 related to the motor M2 is on (the motor M2 is driven) at an address 00331 assigned to the interlock program IP, the output relay m1 of the motor M1 is turned off. The interlock program IP is executed after the control program module b is executed. The result of the execution of the operation of the control program module b is written into the I/O memory 16, after which the result of the execution of the interlock program IP is written into (overwritten on) the I/O memory 16. It is assumed that an indication that the relay m1 should be turned on is stored in the I/O memory 16 in accordance with a program of the address 00103, and that a program of the address 00331 assigned to the interlock program IP is then executed, so that the result of the operation denying that the relay m1 is turned on is obtained. In this case, output data indicating that the relay m1 should be turned on in the I/O memory 16 is rewritten to be output data indicating that it should be turned off. Priority is thus given to the interlock conditions set in the interlock program IP. A combination of the control program module b and the program of the address 00331 assigned to the interlock program IP is equivalent to the program module B shown in FIG. 8.

In the programming tool 20, a plurality of control program modules and interlock programs related thereto are separately created. Either of the control program module and the interlock program may be first created. In creating the control program module, only input and output variables in a control system whose control is taken charge of by the control program module are considered (an input variable in a control system whose control is taken charge of by the other control program module may be considered). In creating the interlock program, it is examined whether or not each of the input and output variables (or only the output variable) is correlated with two or more control systems whose control is taken charge of by two or more control program modules, and interlock conditions determined by the correlation therebetween are described in consideration of the order.

At the time of programming of the control program module, all interlock conditions concerning each of output relays (output variables) need not be considered. The order in which control programs are executed need not be necessarily considered. In creating the interlock program, only the interlock conditions concerning each of the output relays (output variables) (including the order of execution) may be considered. The programming is thus facilitated, and the work efficiency is improved.

All the interlock conditions in the control system whose control is taken charge of by one of the control program modules may be described in the interlock program. For example, in the program of the address 00076 shown in FIG. 2, a combination of the internal contact c2 and the output relay m1 indicates the interlock conditions. The program of the address 00076 may be only a combination of the input contact s1 and the output relay m1, and a combination of the internal contact c2 and the output relay ml may be set as the interlock program.

The control program and the interlock program are correlated with each other by the output variable. For example, the control program of the address 00076 includes the output relay m1 concerning the motor M1. The interlock program of the address 00328 related thereto also includes the output relay m1 concerning the motor M1. Consequently, the control program of the address 00076 and the interlock program of the address 00328 are correlated with each other by the output relay m1. The interlock program of the address 00331 is also related to the output relay m1. In order to clarify that the control program of the address 00076 is correlated with the interlock program of the address 00328, an operator may enter information relating to the correlation at the time of creating the control program or the interlock program, if required.

Figure 4:
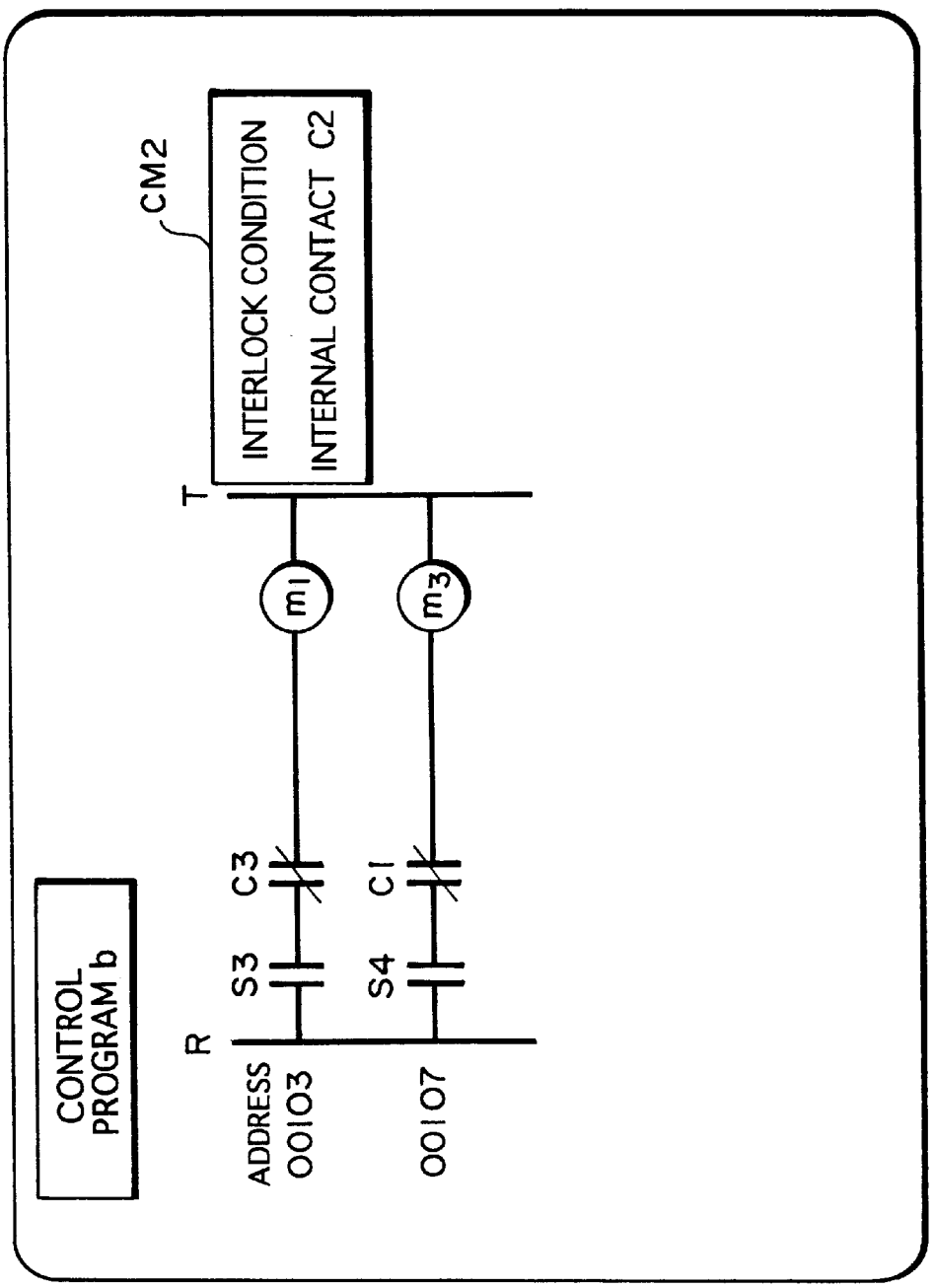

FIGS. 3 and 4 illustrate examples of a screen displayed on the display device 23 in the programming tool 20 when the control program module is created (in a case where the interlock program has been already created), after all the programs are completed, or in checking a state where the programmable controller is executed.

A control program module is displayed, and an interlock condition setting column is displayed beside its output relay. In FIG. 3, a column CM1 indicating that interlock conditions by the internal contact c3 has been set is displayed beside the output relay m1 of the control program module a with respect to the output relay m1. In FIG. 4, a column CM2 indicating that interlock conditions by the internal contact c2 are set is displayed beside the output relay m1 of the control program module b with respect to the output relay m1. Such display is performed on the basis of the above-mentioned information relating to the correlation. Although in one of the control programs, interlock conditions concerning an element included in a control system whose control is taken charge of by the other control program module are not described, interlock conditions are thus displayed in relation to the display of the one control program module, so that it is found that the interlock conditions are set, and it is found what the interlock conditions depend on.

Figure 5:
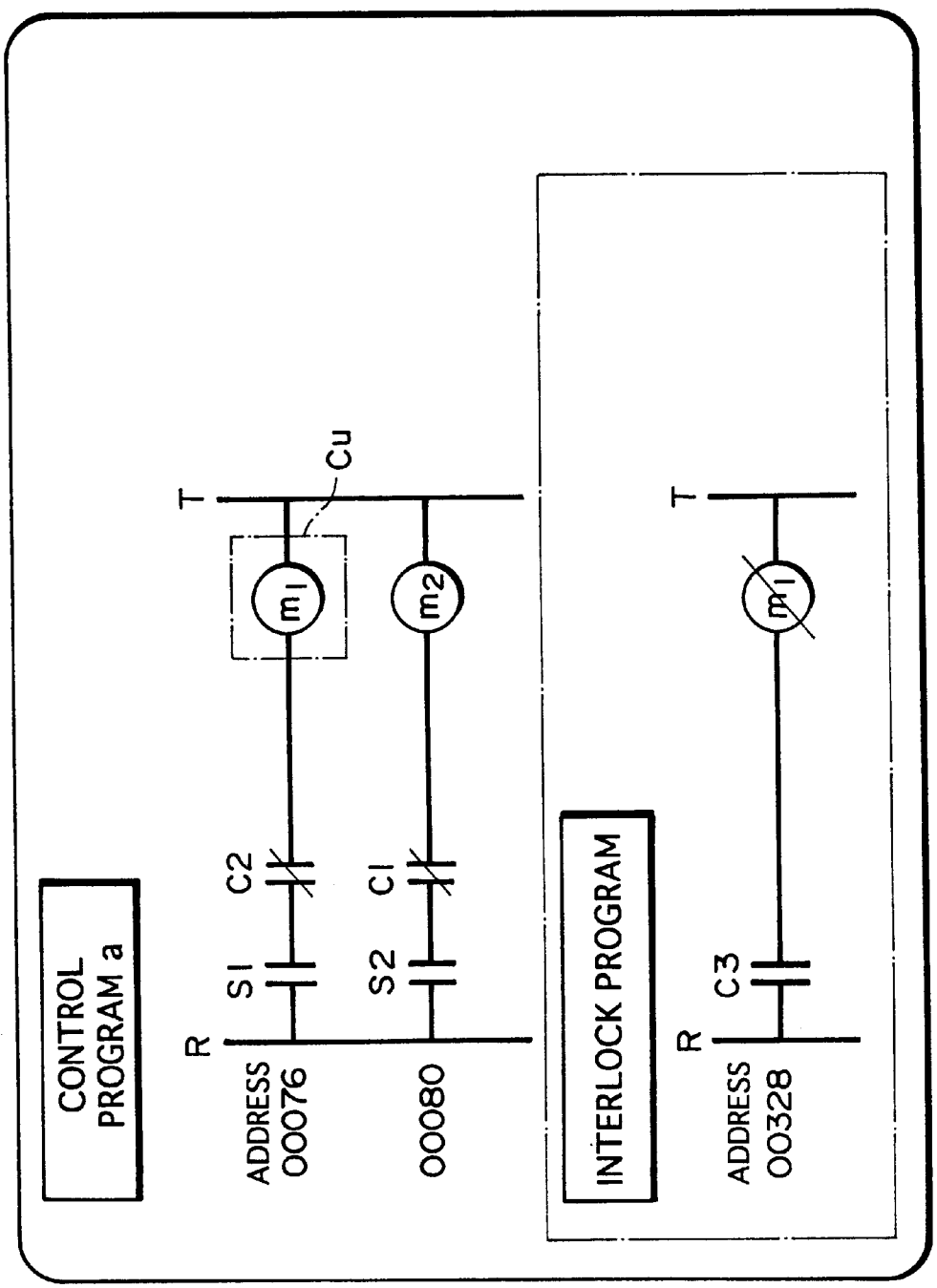
FIG. 5 illustrates another example of display.

FIG. 5 illustrates another example of display. A control program module a is displayed. When a cursor Cu is moved to a position of an output relay m1 in the control program module a, an interlock program set in relation to the output relay m1 designated by the cursor Cu in the control program module a is displayed in another position on the same screen. This display is also achieved by retrieving information relating to the correlation between a control program and an interlock program on a memory. It is thus found that interlock conditions are set in particular output relays of various control programs, and the contents thereof are rapidly found.

An interlock program must be executed after a control program is executed. As a method of ensuring this, an interlock program is arranged behind all control programs, as described above. That is, an address assigned to the interlock program shall have a larger value than addresses assigned to all the control programs on the premise that programs are executed in the order of addresses (they are controlled by a system program). The addresses may be automatically set by the programming tool 20, or may be manually entered by an operator. The other method is a method of automatically or manually adding to an interlock program identification data indicating that it is an interlock program. The programmable controller 10 executes the interlock program after executing all the control programs while recognizing the identification data in accordance with a system program.

Figure 6:
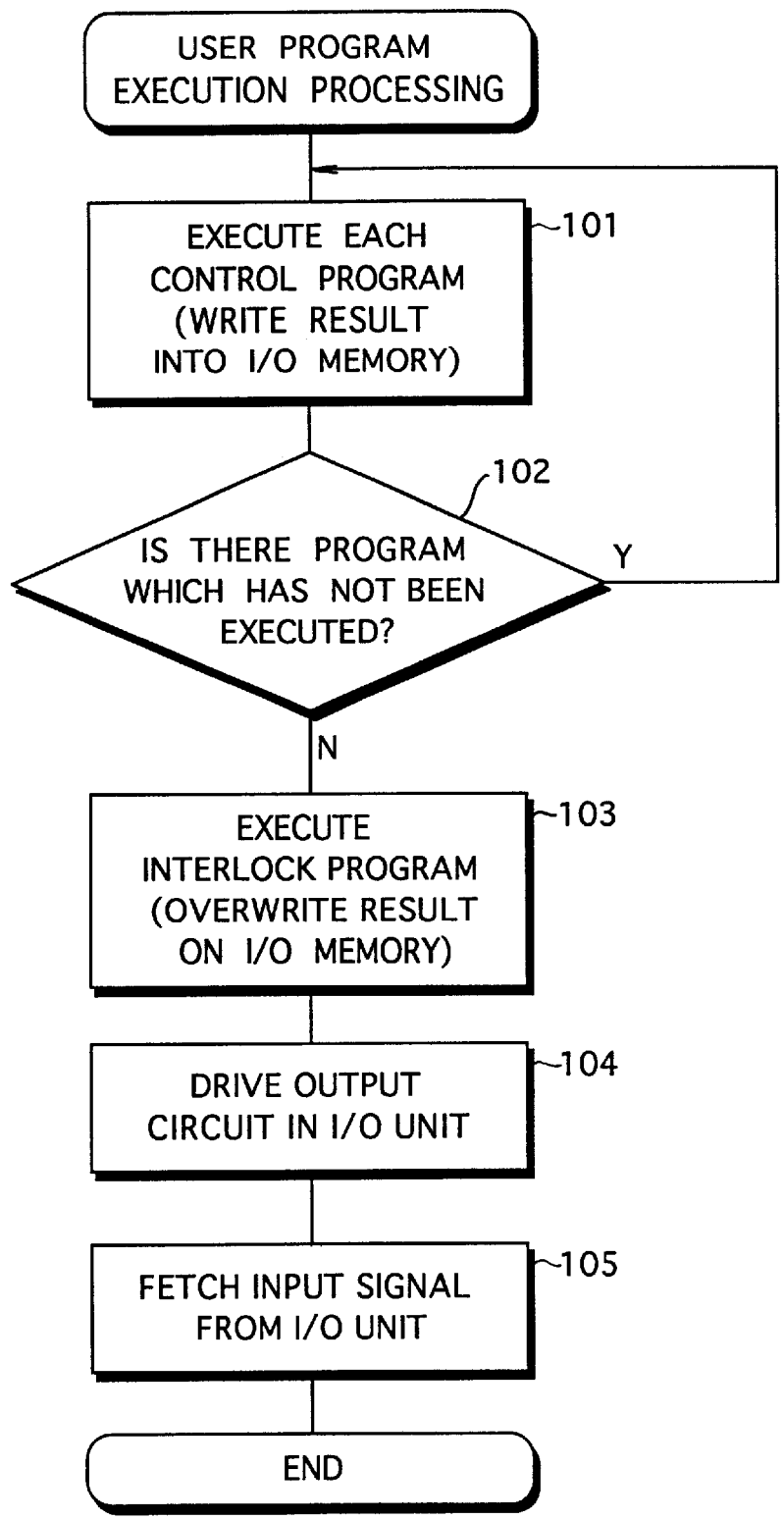
FIG. 6 is a flow chart showing the procedure for execution of a user program in a programmable controller.

FIG. 6 shows the procedure for processing conforming to a user program executed in accordance with a system program in the programmable controller 10. The user program shall be stored in the user program memory 15.

Control program modules are successively read out, so that various operations conforming to the programs are executed. The result of the operation is written into a corresponding location of the I/O memory 16 (step 101). This processing is repeatedly performed with respect to all the control program modules (step 102).

Interlock programs are then successively read out, so that various operations conforming to the programs are executed. The result of the operation is overwritten on a corresponding location of the I/O memory 16 (step 103). As described above, the result of the operation of the interlock program precedes the result of the operation of the control program.

After the execution of all the interlock programs is terminated, output data in the I/O memory 16 is transferred to the I/O unit 30, and output circuits in the I/O unit 30 are driven on the basis of the output data (step 104). Control signals or driving signals are outputted from the I/O unit 30, and are fed to control equipments or devices or driving devices constituting a controlled system.

Input data generated on the basis of signals fed to the I/O unit 30 from sensors, switches or the like in the controlled system are transferred from the I/O unit 30 to the I/O memory 16, and are written into the I/O memory 16 (step 105).

The steps 101 to 105 constitute a one-cycle operation in the programmable controller 10, and this operation is repeated in a predetermined period.

What is claimed is:

1. A programmable controller comprising:
   a user program memory storing a user program including a control program from which a description defining interlock conditions is excluded and an interlock program defining said interlock conditions for a result of processing conforming to said control program and described separately from said control program;
   an I/O memory storing data relating to an input for said user program and an output obtained by processing conforming to said user program; and
   a processor for first reading out said control program from said user program memory, performing processing conforming to the control program and writing a result thereof into said I/O memory, and then reading out said interlock program from said user program memory, performing processing conforming to the interlock program and writing the result thereof into said I/O memory.

2. A programmable controller according to claim 1, comprising:
   a user program memory storing a user program including a control program from which a description defining interlock conditions is excluded and an interlock program defining said interlock conditions for a result of processing conforming to said control program and described separately from said control program;
   an I/O memory storing data relating to an input for said user program and an output obtained by processing conforming to said user program; and
   a processor for first reading out said control program from said user program memory, performing processing conforming to the control program and writing a result thereof into said I/O memory, and then reading out said interlock program from said user program memory, performing processing conforming to the interlock program and writing the result thereof into said I/O memory,
   wherein said control program comprises a plurality of control program modules sharing the control of a controlled system, and
   said interlock program describes interlock conditions excluded from said plurality of control program modules.

3. The programmable controller according to claim 2, wherein
   in said interlock program, the interlock program relating to one of the control program modules describes interlock conditions determined in relation to an element of the control allocated to the other control program module.

4. A storage medium storing a user program for controlling a programmable controller, which is executable by the programmable controller, the user program comprising:
   a control program from which a description defining interlock conditions is excluded; and
   an interlock program defining said interlock conditions for a result of processing conforming to said control program and described separately from said control program, and having a structure ensuring that said interlock program is executed after said control program is executed.

5. A storage medium storing a user program for controlling a programmable controller, which is executable by the programmable controller, said user program comprising:
   a control program, from which a description defining interlock conditions is excluded, comprising a plurality of control program modules sharing control of a controlled system; and
   an interlock program defining said interlock conditions for results of processing conforming to said plurality of control program modules and described separately from said control program modules, and has a structure ensuring that said interlock program is executed after all said control program modules are executed.

6. The storage medium according to claim 5, wherein in said interlock program, the interlock program relating to one of the control program modules describes interlock conditions determined in relation to an element of the control allocated to another control program module.

7. A method of executing a user program for controlling a programmable controller, stored in a storage medium the user program being executable by the programmable controller, the user program comprising a control program from which a description defining interlock conditions is excluded, and an interlock program defining said interlock conditions for a result of processing conforming to said control program and described separately from said control program, and having a structure ensuring that said interlock program is executed after said control program is executed the method comprising the steps of:

first reading out said control program from said storage medium, performing processing conforming to the control program and writing the result thereof into an I/O memory in accordance with said ensuring; and reading out said interlock program from said storage medium, performing processing conforming to the interlock program and writing the result thereof into said I/O memory after performing the whole of said control program.

8. A programming device, comprising an input device and a storage device, for accepting input of a control program from which a description defining interlock conditions is excluded by said input device, accepting input of an interlock program describing said interlock conditions for a result of processing conforming to said control program separately from the input of said control program, and storing the control program and the interlock program which have been accepted in said storage device in correlation with each other in a form ensuring that said interlock program is executed only after said control program is executed.

9. The programming device according to claim 8, further comprising a display device, and displaying on the display device, said control program, and the correlation between the displayed control program and the interlock program, or the interlock program correlated with the displayed control program.

10. A method of executing a user program for controlling a programmable controller, stored in a storage medium the user program being executable by the programmable controller, said user program comprising a control program, from which a description defining interlock conditions is excluded, comprising a plurality of control program modules sharing control of a controlled system, and an interlock program defining said interlock conditions for results of processing conforming to said plurality of control program modules and described separately from said control program modules, and has a structure ensuring that said interlock program is executed after all said control program modules are executed, the method comprising the steps of:

first reading out said control program from said storage medium, performing processing conforming to the control program and writing the result thereof into an I/O memory in accordance with said ensuring; and reading out said interlock program from said storage medium, performing processing conforming to the interlock program and writing the result thereof into said I/O memory after performing the whole of said control program.

* * * * *